April 23, 1929.   G. E. SIMONS   1,710,517
LIQUID MEASURING CONTAINER
Filed Feb. 14, 1927
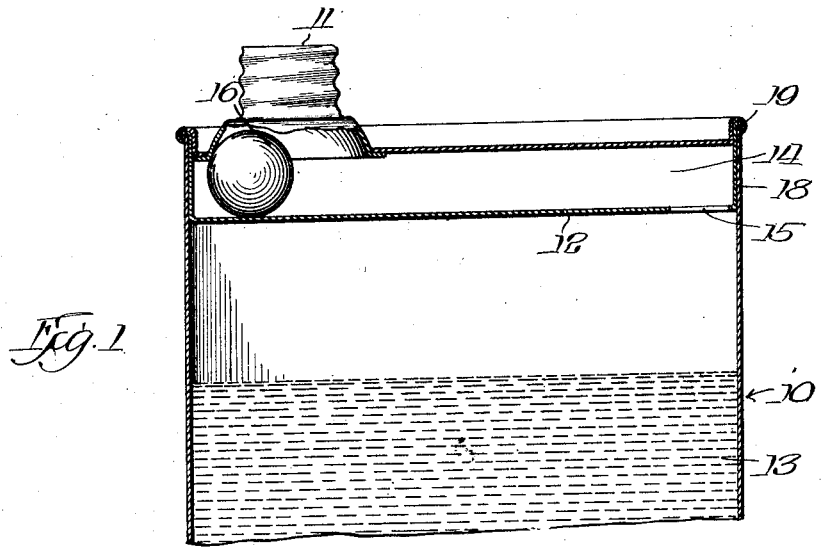
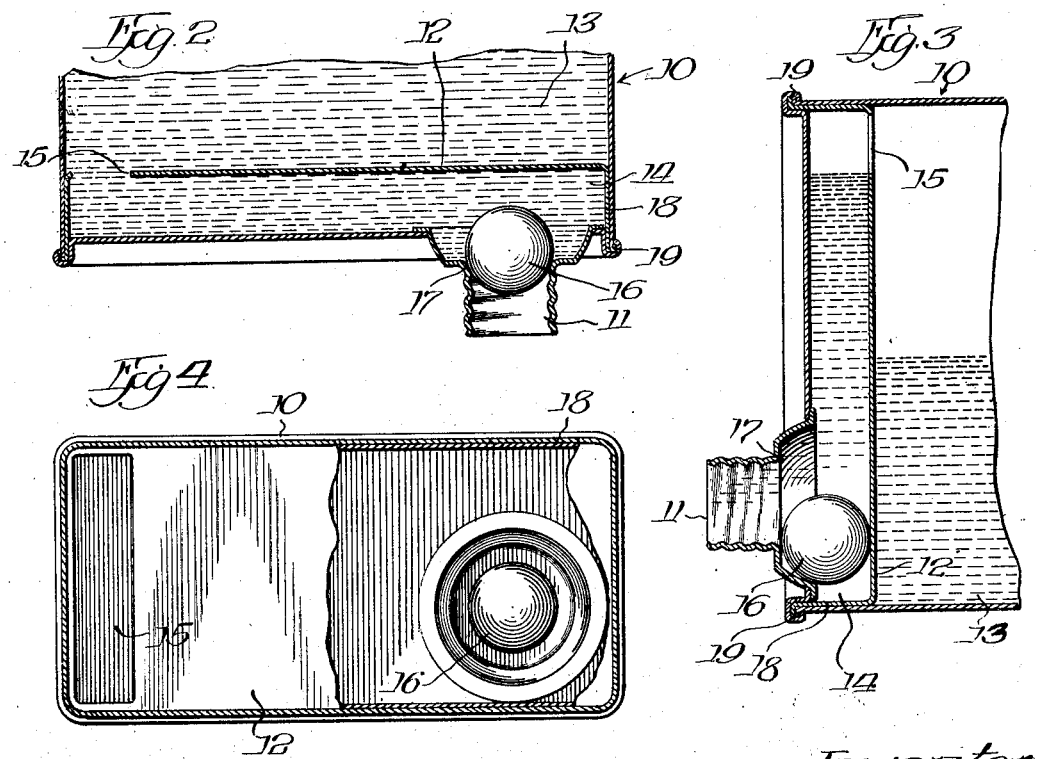

Patented Apr. 23, 1929.

1,710,517

UNITED STATES PATENT OFFICE.

GEORGE E. SIMONS, OF KENILWORTH, ILLINOIS.

LIQUID-MEASURING CONTAINER.

Application filed February 14, 1927. Serial No. 167,940.

My invention relates to liquid measuring containers.

One of the objects of my invention is to provide a container having improved means whereby the liquid therein may be delivered therefrom in accurately measured quantities.

Such a container is useful in many relations. It might be used for instance to deliver measured charges of oil from a comparatively large oil can to the crank case of an automobile.

A further object of my invention is to provide such a construction which will be substantially automatic in operation.

A further object is to provide such a construction which will be simple, cheap, and durable.

Further objects will appear from the description and claims.

In the drawings, in which an embodiment of my invention is shown,

Figure 1 is a vertical sectional view showing the upper end of a measuring can, the can being in upright position;

Fig. 2 is a view of the measuring can in inverted position, in which position the measuring chamber is filled with the liquid;

Fig. 3 is a view of the can laid on its side to permit the discharge of the liquid from the measuring chamber; and Fig. 4 is a top view of the can with parts broken away to show the interior construction.

Referring now to the drawings in detail, the construction shown comprises a measuring can 10 having a discharge opening 11 at its top, a transverse horizontally extending partition 12 adjacent the discharge opening which divides the measuring can into a main larger chamber 13 below this transverse partition, and a smaller measuring chamber 14 above the partition. An opening 15 is provided in the partition at the side remote from the discharge opening which affords communication between the main chamber and the measuring chamber for filling the latter.

An automatically acting valve 16 is provided which automatically close the discharge opening when the container is placed bottom up as shown in Fig. 2, and which rolls away from its seat 17 when the can is placed on its side, as shown in Fig. 3. For convenience and simplicity of manufacture, the partition 12 may be provided with a peripheral flange 18 which fits snugly inside the walls of the can and which extends up to the top of the can and, together with the edge of the top of the can, is flanged over the upper edge of the body portion of the can as indicated at 19. The partition is spaced from the top of the can a distance which is less than the diameter of the ball valve which construction holds the ball in operative relation with respect to its seat so that it will move to its seat when the can is stood bottom up, and will roll away from the seat to the position shown in Fig. 3 when the can is laid on its side.

The operation of the can has been outlined in connection with the description of the construction.

The can ordinarily stands upright as shown in Fig. 1. To fill the measuring chamber, the can is quickly inverted to a position shown in Fig. 2 in which the ball rests against its seat and in which the measuring chamber is filled from the main chamber. The can is then placed on its side as shown in Fig. 3 and the ball rolls away from the seat to permit the liquid in the measuring chamber to flow out to the discharge opening.

If for any reason it might be desired to pour all of the liquid out of the can without interruption, this can be accomplished by placing the can on its broad side as shown in Fig. 4 with the discharge opening on the lower side. In this position all of the liquid in the can will run out without interruption as the opening 15 extends from one broad side of the can to the other.

While I have shown but one embodiment of my invention, it is obvious that many modifications therein may occur to those skilled in the art, and I desire, therefore, that my invention be limited only by the scope of the appended claims and by the prior art.

I claim:

1. A liquid measuring container having a discharge opening in its top adjacent one side thereof, and having a horizontal transverse partition adjacent the top dividing the container into two chambers, the main larger chamber being below the partition and the smaller measuring chamber being above the partition, means affording connection between the main chamber and the measuring chamber whereby the container may be placed bottom up to fill the measuring chamber and then laid on that side which is adjacent the discharge opening to discharge the liquid from the measuring chamber, and a valve for controlling the flow through said discharge opening, said partition having a peripheral flange portion integral therewith extending to the top of the container whereby said top together with the partition and its flange are comprised as walls of the measuring chamber.

2. A liquid measuring container having a discharge opening in its top adjacent one side thereof, and having a horizontal transverse partition adjacent the top dividing the container into two chambers, the main larger chamber being below the partition and the smaller measuring chamber being above the partition, means affording connection between the main chamber and the measuring chamber whereby the container may be placed bottom up to fill the measuring chamber and then laid on that side which is adjacent the discharge opening to discharge the liquid from the measuring chamber, and a valve for controlling the flow through said discharge opening, said partition having a peripheral flange portion integral therewith extending to the top of the container whereby said top together with the partition and its flange are comprised as walls of the measuring chamber, said flange and top being flanged over the upper edge of the body of the container to secure them to the container.

3. A liquid measuring container having a discharge opening in its top adjacent one side thereof, and having a horizontal transverse partition adjacent the top dividing the container into two chambers, the main larger chamber being below the partition and the smaller measuring chamber being above the partition, means affording connection between the main chamber and the measuring chamber whereby the container may be placed bottom up to fill the measuring chamber and then laid on that side which is adjacent the discharge opening to discharge the liquid from the measuring chamber, a valve seat surrounding said discharge opening, a gravity controlled valve freely movable in the measuring chamber cooperating with said seat which closes the discharge opening when the container is placed bottom up for filling the measuring chamber and which falls away from its seat when the container is placed on its side to open the discharge passage.

4. A liquid measuring container having a discharge opening in its top adjacent one side thereof, and having a horizontal transverse partition adjacent the top dividing the container into two chambers, the main larger chamber being below the partition and the smaller measuring chamber being above the partition, means affording connection between the main chamber and the measuring chamber whereby the container may be placed bottom up to fill the measuring chamber and then laid on that side which is adjacent the discharge opening to discharge the liquid from the measuring chamber, a ball valve seat surrounding said discharge opening, a gravity controlled valve cooperating with said seat which closes the discharge opening when the container is placed bottom up for filling the measuring chamber and which falls away from its seat when the container is placed on its side to open the discharge passage, said partition being spaced from the top of the container less than the diameter of the ball whereby the partition serves to hold the ball in operative position.

In witness whereof, I have hereunto subscribed my name.

GEO. E. SIMONS.